US011457573B2

United States Patent
Eliasson

(10) Patent No.: US 11,457,573 B2
(45) Date of Patent: Oct. 4, 2022

(54) TREE HARVESTING MACHINE, A TREE HARVESTING MONITORING SYSTEM, A TREE HARVESTING HEAD, A METHOD FOR CONTROLLING OPERATION OF A TREE HARVESTING HEAD AND A METHOD FOR MONITORING OPERATION OF A TREE HARVESTING MACHINE

(71) Applicant: LOG MAX AB, Grangärde (SE)

(72) Inventor: Mikael Eliasson, Borlänge (SE)

(73) Assignee: LOG MAX AB, Grangärde (SE)

( * ) Notice: Subject to any disclaimer, the term of this patent is extended or adjusted under 35 U.S.C. 154(b) by 147 days.

(21) Appl. No.: 16/301,479

(22) PCT Filed: May 10, 2017

(86) PCT No.: PCT/EP2017/061112
§ 371 (c)(1),
(2) Date: Nov. 14, 2018

(87) PCT Pub. No.: WO2017/198504
PCT Pub. Date: Nov. 23, 2017

(65) Prior Publication Data
US 2019/0297793 A1 Oct. 3, 2019

(30) Foreign Application Priority Data
May 17, 2016 (SE) .................... 1650663-6

(51) Int. Cl.
*A01G 23/091* (2006.01)
*A01G 23/083* (2006.01)
(Continued)

(52) U.S. Cl.
CPC ......... *A01G 23/091* (2013.01); *A01G 23/083* (2013.01); *B27B 17/0058* (2013.01); *B27B 17/08* (2013.01)

(58) Field of Classification Search
CPC .... A01G 23/08; A01G 23/083; A01G 23/087; A01G 23/091; A01G 23/093; A01G 23/095; B27B 17/08
See application file for complete search history.

(56) References Cited

U.S. PATENT DOCUMENTS 3,565,372 A * 2/1971 Robert ................. A01G 23/091
248/278.1
3,849,884 A * 11/1974 Arff ....................... B27B 17/10
30/383
(Continued)

FOREIGN PATENT DOCUMENTS

BY           8641 C1   12/2006
DE  20 2010 017 469 U1   2/2012
(Continued)

OTHER PUBLICATIONS

International Search Report and Written Opinion for corresponding International Application No. PCT/EP2017/061112 dated Aug. 21, 2017.
(Continued)

*Primary Examiner* — Matthew Katcoff
(74) *Attorney, Agent, or Firm* — Renner, Otto, Boisselle & Sklar, LLP

(57) ABSTRACT

The present disclosure relates to a tree harvesting machine (120) having a crane arm (118), wherein the crane arm (118) comprises a tree harvesting head (100; 200) arranged at a free end of the crane arm (118). The tree harvesting head (100) comprises a saw (104) and at least two feed wheels (102). The tree harvesting head (100) further comprises an electric motor (106*a*) arranged to drive the saw (104), and at least one electric motor (106*b*) arranged to drive the feed wheels (102). The present disclosure also relates to associ-
(Continued)

ated tree harvesting monitoring systems, tree harvesting heads, methods and computer programs.

14 Claims, 4 Drawing Sheets

(51) Int. Cl.
*B27B 17/00* (2006.01)
*B27B 17/08* (2006.01)

(56) References Cited

U.S. PATENT DOCUMENTS

| | | | |
|---|---|---|---|
| 5,727,610 A | 3/1998 | Isley | |
| 7,017,460 B2 * | 3/2006 | Virvalo | A01G 23/091 83/13 |
| 10,602,681 B2 * | 3/2020 | Lundgren | A01G 23/095 |
| 2003/0097917 A1 | 5/2003 | Virvalo et al. | |
| 2006/0021675 A1 * | 2/2006 | Gurosik | A01B 59/06 144/34.1 |
| 2010/0147420 A1 | 6/2010 | Voermans | |
| 2014/0027019 A1 | 1/2014 | Ketonen | |

FOREIGN PATENT DOCUMENTS

| | | | |
|---|---|---|---|
| DE | 202010017469 U1 * | 2/2012 | ........... A01G 23/091 |
| DE | 10 2010 015 231 A1 | 8/2012 | |
| DE | 10 2015 002 324 B3 | 3/2016 | |
| JP | 5869823 B2 | 1/2016 | |
| WO | 2000/065900 A1 | 11/2000 | |
| WO | 2003/096794 A1 | 11/2003 | |
| WO | 2005/020669 A1 | 3/2005 | |

OTHER PUBLICATIONS

Search Report for corresponding Swedish Application No. 1650663-6 dated Nov. 30, 2016.
Office Action for corresponding Swedish Application No. 1650663-6 dated Nov. 30, 2016.

* cited by examiner

TREE HARVESTING MACHINE, A TREE HARVESTING MONITORING SYSTEM, A TREE HARVESTING HEAD, A METHOD FOR CONTROLLING OPERATION OF A TREE HARVESTING HEAD AND A METHOD FOR MONITORING OPERATION OF A TREE HARVESTING MACHINE

This application is a national phase of International Application No. PCT/EP2017/061112 filed May 10, 2017, and claims priority to Swedish Application No. 1650663-6 filed on May 17, 2016, which is incorporated herein by reference.

TECHNICAL FIELD

The present disclosure relates to tree harvesting assemblies at the end of a crane arm of a tree harvesting machine.

BACKGROUND ART

During a typical tree harvesting process, involving cutting a tree and delimbing it, a crane arm of a tree harvesting machine is guided to the trunk of the tree. A tree harvesting head at the end of the crane arm grips the trunk of the tree by means of hydraulic arms or delimbing knives, as well as two or more feed wheels. A saw of the tree harvesting head proceeds to sever the trunk of the tree. The tree is then fed through the grip of the tree harvesting head by the feed wheels as the tree is delimbed. The saw is often used to further cut the delimbed trunk portion of the tree trunk as the tree trunk has been fed a suitable distance via the tree trunk head.

One of the main objectives with tree harvesting machines is to produce as much useable wood as possible while using as little fuel as possible. During a typical tree harvesting process, as described above, the saw has to overcome a significant amount of friction as it cuts through the trunk of the tree, thereby leading to energy losses. Additional energy losses occur when the feed wheels pull the tree through the tree harvesting head for delimbing. In addition to resistance experienced when delimbing knives of the tree harvesting head cut through branches of the tree, frictional losses associated with the moving tree coming into contact with parts of the tree harvesting head when being fed with the feed wheels also contribute to energy losses.

There is thus a need in the art to improve operating efficiency, in particular energy efficiency, of tree harvesting assemblies.

SUMMARY OF THE INVENTION

An object of the present disclosure is to provide tree harvesting heads and tree harvesting machines to mitigate or at least alleviate some of the above identified problems.

The disclosure proposes a tree harvesting machine having a crane arm, wherein the crane arm comprises a tree harvesting head arranged at a free end of the crane arm. The tree harvesting head comprises a saw and at least two feed wheels. The tree harvesting head further comprises an electric motor arranged to drive the saw, and at least one electric motor arranged to drive the feed wheels. In hydraulic systems driven by a hydraulic motor, the energy provided by the hydraulic motor depends on the pressure of the hydraulic fluid and the flow rate of the hydraulic fluid. Components having high flow rates of hydraulic fluid at high pressures are therefore typically the components to exhibit the greatest energy losses in hydraulic systems. Most of the energy loss in hydraulic powered tree harvesting heads occurs at the saw and the feed wheels. By introducing electric motors to drive the saw and the feed wheels, the energy efficiency of the tree harvesting head, and hence the tree harvesting machine, is greatly improved with respect to conventional hydraulic powered tree harvesting heads. The greatest difference in energy loss between a hydraulic system and an electric system occurs at low torque output. The proposed tree harvesting head is thus particularly efficient compared to conventional hydraulic powered tree harvesting heads at low torque output from the motors. This becomes apparent e.g., when feeding trees having a small diameter of the tree trunk through the tree harvesting head, since feeding trees having a small diameter typically is performed at relatively low torque. An additional advantage of introducing electric motors is that many of the hydraulic hoses, valves and hydraulic manifolds can be omitted or reduced in dimension compared to conventional hydraulic powered tree harvesting heads.

According to some aspects, the tree harvesting machine is arranged to provide hydraulic fluid to the tree harvesting head via a hydraulic interface of the tree harvesting head the hydraulic fluid cooling at least one of the electric motors and/or at least one power inverter of the tree harvesting head. By using hydraulic oil from the tree harvesting machine, there is no need for the tree harvesting head to have a separate cooling source. This result in a lighter and more compact tree harvesting head compared to a tree harvesting head having a dedicated cooling source.

According to some aspects, the tree harvesting machine further comprises a control unit arranged to control at least one of the electric motors and/or a functional unit of the tree harvesting machine based on an obtained current state related to at least one of the electric motors. The control unit enables automatic adjustments to improve efficiency and reducing risk of damage during operational use of the tree harvesting machine.

According to some aspects, the tree harvesting machine comprises a sensor arranged to determine the current state, wherein the current state comprises a current angle of a shaft of a rotor and/or input power and/or output power of the at least one of the electric motors. Determination of the current state enables efficient regulation of how hard the saw is pressed against a tree during operational use of the tree harvesting machine. The saw typically comprises a saw chain, which is arranged to operate within certain safety limits, e.g. it may only be dimensioned to operate up to a maximally allowed output power. Determination of the current state also enables regulating the stress experienced by the saw, thereby facilitating implementation of safety regulating aspects. By determining the current state, in particular the angle of the shaft of an electric motor, an operator may be provided with information assisting operational use. The operator may also be provided with information relating to troubles, e.g. malfunctions, and be provided with assistance in taking measures to overcome the troubles, i.e. troubleshooting.

In order to be able to provide a high initial torque, it is necessary to know the angle of a rotor with respect to a corresponding stator at each instance. Determination of the angle of the shaft provides the necessary information. The feed wheels may then feed trees from a stand still more easily compared to a feed wheel only able to provide a low initial torque. The high initial torque may also be used by the feed wheels to handle heavier trees and/or trees having branches providing high resistance to being fed by the feed wheels.

According to some aspects, the control unit is further arranged to transmit data related to the current state to a monitoring unit for diagnosis and/or troubleshooting. The control unit functions as a coordination unit and provides the monitoring unit with a single interface to which control signals are transmitted.

According to some aspects, the functional unit comprises actuating means arranged to adjust a current pressure of the saw based on an output power of the current state. By adjusting the current pressure of the saw based on the output power of the current state, the mechanical stress experienced by the saw, and in particular a saw chain of the saw, may be regulated to ensure that the stress remains within predetermined safety limits.

According to some aspects, the actuating means comprises at least one of a hydraulic cylinder, a hydraulic motor or an electric motor. The actuating means provides flexibility in the choice of actuator arranged to adjust the pressure of the saw. A hydraulic cylinder and/or a hydraulic motor enable reusing much of the existing hardware of hydraulic-based legacy tree harvesting machines. An electric motor as part of the actuating means may potentially be more energy efficient than a hydraulic based equivalent. Furthermore, an electric motor might be integrated more easily with the electric system providing electricity to the other electric motors.

The disclosure also relates to a tree harvesting monitoring system comprising a monitoring unit for diagnosis and/or troubleshooting and a tree harvesting machine, wherein the monitoring unit and the tree harvesting machine are communicatively linked. The tree harvesting machine is a tree harvesting machine according to the present disclosure. The monitoring unit is arranged to obtain data relating to a current state of at least one of the electric motors. The monitoring unit is further arranged to perform diagnosis and/or troubleshooting based on the obtained data. By monitoring the state of the tree harvesting head, in particular the angle of the shaft of an electric motor, an operator may be provided with information assisting operational use. The operator may also be provided with information relating to troubles, e.g. malfunctions, and be provided with assistance in taking measures to overcome the troubles, i.e. troubleshooting.

According to some aspects, the tree harvesting machine comprises a control unit arranged to control at least one of the electric motors and/or a functional unit of the tree harvesting machine based on the current state. The control unit is further arranged to receive control signals from the monitoring unit. Troubleshooting based on the obtained data comprises transmitting a control signal arranged to adjust the mechanical output power of the at least one electric motor and/or a functional unit of the tree harvesting machine to the control unit of the tree harvesting machine. The monitoring system thereby also enables the operational use of the tree harvesting head to be partially or fully automated. By partially or fully automating the operational use of the tree harvesting head, the need for operator skill is reduced.

According to some aspects, the monitoring unit and the tree harvesting machine are separate devices that are wirelessly linked. By monitoring the tree harvesting machine using an external device, the processing power needed to process the data related to a current state of at least one of the electric motors is kept separate from the tree harvesting machine. This reduces the need to integrate computer circuitry into the tree harvesting machine. Instead, existing hardware technology, e.g. a laptop, may be used as a basis for providing the needed processing power, wherein the existing hardware technology is arranged to receive the data and perform diagnosis and/or troubleshooting based on the obtained data.

The disclosure also relates to a tree harvesting head for a tree harvesting machine having a crane arm. The tree harvesting head comprises a saw and at least two feed wheels. The tree harvesting head further comprises an electric motor arranged to drive the saw, and at least one electric motor arranged to drive the feed wheels. Most of the energy loss in hydraulic powered tree harvesting heads occurs at the saw and the feed wheels. By introducing electric motors to drive the saw and the feed wheels, the energy efficiency of the tree harvesting head is greatly improved with respect to conventional hydraulic powered tree harvesting heads. The greatest difference in energy loss between a hydraulic system and an electric system occurs at low torque output. The proposed tree harvesting head is thus particularly efficient compared to conventional hydraulic powered tree harvesting heads at low torque output from the motors. This becomes apparent e.g., when feeding trees having a small diameter of the tree trunk through the tree harvesting head, since feeding trees having a small diameter typically is performed at relatively low torque. An additional advantage of introducing electric motors is that many of the hydraulic hoses, valves and hydraulic manifolds can be omitted or reduced in dimension compared to conventional hydraulic powered tree harvesting heads.

According to some aspects, the at least two feed wheels each have a dedicated electric motor arranged to drive the respective feed wheel. Electric motors are typically heavier than a corresponding hydraulic motor. By providing each feed wheel with a dedicated motor, the work load when feeding trees with the feed wheels is distributed over several electric motors. This enables an improved ratio between the weight of the electric motor arranged to drive a feed wheel and its output power. Additionally, electric motors are typically arranged with means that enables a determination of an angle of a shaft of a rotor of the respective electric motors. By being able to determine said angle at the motor, the distance between the point of measuring the angle of the shaft and the actual shaft is minimized. The short distance between the angle measurement means and the shaft implies that the current may be applied in phase with the respective electric motor, which in turn enables accurate control of the electric motors.

According to some aspects, the tree harvesting head comprises an angle sensor arranged to determine an angle of a shaft of a rotor of a corresponding electric motor.

According to some further aspects, the angle sensor is comprised in the corresponding electric motor. In order to be able to provide a high initial torque, it is necessary to know the angle of a rotor with respect to a corresponding stator at each instance. The angle sensor provides an estimate of the angle. The precision of the angle estimations at high motor speeds typically decreases as the distance between the motor and the apparatus arranged to estimate the angle of the rotor increases. By integrating an angle sensor in each electric motor, the precision of a corresponding angle estimation of a respective rotor is increased, in particular at high motor speeds. The improved precision of the angle estimation enables improved precision in controlling the output power of the electric motor. For instance, the operational use of the saw can be optimized with respect to sawing speed, which enables a reduction in breaking of wood as a tree is cut, thereby reducing waste.

According to some aspects, a gear is arranged between each feed wheel and the respective electric motor arranged to drive the feed wheel, the gear being arranged to provide a predetermined torque to output power ratio, the output power being an output power of the respective electric motor arranged to drive the feed wheel. The gear between the motor and the feed wheel it drives provides the feed wheel with the necessary torque without having to increase the size of the electric motor, i.e. the gear enables the weight of the electric motor to be kept at a reasonable level.

According to some aspects, the tree harvesting head comprises a hydraulic interface arranged to provide hydraulic fluid from the tree harvesting machine, the hydraulic fluid cooling at least one of the electric motors and/or at least one power inverter of the tree harvesting head. By using hydraulic oil from the tree harvesting machine, there is no need for the tree harvesting head to have a separate cooling source. This result in a lighter and more compact tree harvesting head compared to a tree harvesting head having a dedicated cooling source.

According to some aspects, a slip clutch is arranged between the saw and the electric motor arranged to drive the saw, wherein the slip clutch is arranged limit the amount of mechanical power applied to the saw such that the applied mechanical power stays below a predetermined safety limit. During operational use of the saw, considerable kinetic energy is built up in the moving parts of the saw, typically a chain having sawing elements. When abrupt stops occur, the moving parts experience considerable stress and risk damage. For instance, the chain of a chain saw might be torn apart due to a sudden stop. The slip clutch enables the kinetic energy to dissipate without the saw being subjected to stresses beyond what it can tolerate.

According to some aspects, a rotor of the electric motor arranged to drive the saw has a moment of inertia selected to prevent a saw chain of the saw to be damaged due to stress associated with transfer of kinetic energy to the saw chain during an abrupt stop of the electric motor arranged to drive the saw. The rotor will thus be light enough to prevent that the transfer of kinetic energy to the saw chain associated with abruptly stopping the motor will tear saw chain apart.

According to some aspects, the tree harvesting head further comprises a control unit arranged to control at least one of the electric motors and/or a functional unit of the tree harvesting head based on an obtained current state related to at least one of the electric motors. The control unit has all the technical effects of the corresponding control unit described above in relation to tree harvesting machines.

The disclosure also relates to a method for controlling operation of a tree harvesting head comprising a saw controlled by a first electric motor and at least two feed wheels controlled by at least one second electric motor. The method comprising determining a current state relating to at least one of the first and the at least one second electric motor and controlling the at least one of the first and the at least one second electric motor and/or a functional unit of the tree harvesting head based on the current state. The method steps corresponds to actions performed by components of either the tree harvesting machine, the tree harvesting monitoring system or the tree harvesting head as discussed above and have all the associated effects and advantages.

The present disclosure also relates to a computer program comprising computer program code which, when executed in an element communicatively linked to a tree harvesting head comprising a saw controlled by a first electric motor and at least two feed wheels controlled by at least one second electric motor, causes the element to perform steps of the method for controlling operation of a tree harvesting head. The computer program has all the advantages of the disclosed method for controlling operation of a tree harvesting head.

The disclosure also relates to a method for monitoring operation of a tree harvesting machine, wherein the tree harvesting machine comprises a tree harvesting head comprising a saw controlled by a first electric motor and at least two feed wheels controlled by at least one second electric motor. The method comprises obtaining data relating to a current state of at least one of the electric motors and performing diagnosis and/or troubleshooting based on the obtained data. The method steps corresponds to actions performed by components of either the tree harvesting machine, the tree harvesting monitoring system or the tree harvesting head as discussed above and have all the associated effects and advantages.

The present disclosure also relates to a computer program comprising computer program code which, when executed in an element communicatively linked with the tree harvesting machine, causes the element to perform the steps of the method for monitoring operation of a tree harvesting machine. The computer program has all the advantages of the disclosed method for monitoring operation of a tree harvesting machine.

DETAILED DESCRIPTION

Figure 1:
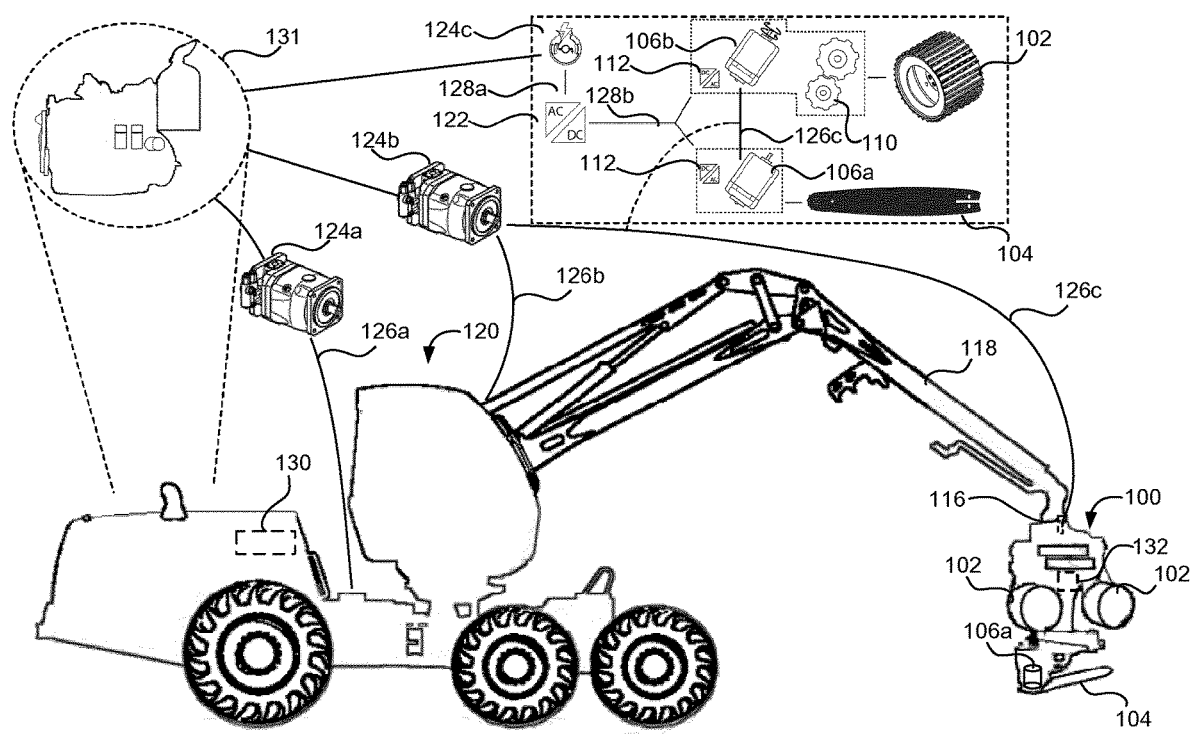
FIG. 1 illustrates a tree harvesting machine according to the present disclosure.

FIG. 1 illustrates a tree harvesting machine 120 according to the present disclosure. The tree harvesting machine 120 has a crane arm 118, wherein the crane arm 118 comprises a tree harvesting head 100 arranged at a free end of the crane arm. The tree harvesting head 100 comprises a saw 104 and two feed wheels 102. The tree harvesting head 100 further comprises an electric motor 106a arranged to drive the saw 104. The two feed wheels 102 each have a dedicated electric motor 106b arranged to drive the respective feed wheel 102. The tree harvesting machine 120 comprises a motor 131 e.g., a diesel motor. The tree harvesting machine 120 further comprises a first and a second hydraulic pump 124a, 124b, and an electric generator 124c. The first and/or second hydraulic pumps 124a, 124b and/or the electric generator 124c may be powered by the motor 131. The electric generator 124c is arranged to output alternating current, AC, via a first electric power interface 128a. A residual current device, RCD, may be arranged immediately after the electric generator 124c to protect people from accidentally injuring themselves by receiving a high current from the electric generator 124c. A rectifier 122 is arranged to receive the alternating current from the first electric power interface 128a and convert it to direct current, DC, at a predetermined voltage. The direct current may then be used to power all or most of the electric components of the tree harvesting machine 120. In particular, direct current is arranged to be fed to the electric motors 106*a*, 106*b* via a second electric power interface 128*b*. Each electric motor 106*a*, 106*b* comprises a power inverter 112 arranged to convert the direct current to alternating current, which is used to drive the electric motors 106*a*, 106*b*.

An electric motor is often arranged to drive a shaft of a rotor by applying current to poles of the rotor and/or stator. The shaft may be surrounded by the poles, which are arranged to produce a magnetic field in response to an applied current. When a pole produces a magnetic field, the rotor rotates in response to the generated electric field. Thus, the mechanism that is used to drive the motor may also be used to determine the current angle of the rotor with respect to the stator, e.g. the angle of the shaft. Since the power inverters 112 are arranged to provide the electric motors with alternating current, the power inverters 112 may be used to continuously measure applied current and determine a positon of the rotor with respect to a corresponding stator. In other words, each power inverter 112 is arranged to determine an angle of a shaft of a rotor of the respective electric motor 106*a*, 106*b*. According to some aspects, each power inverter 112 of the motors 106*a*, 106*b* comprises an angle sensor arranged to determine said angle. This enables each power inverter 112 to apply current in phase with the respective electric motor 106*a*, 106*b*. By being able to apply current in phase with the respective electric motor 106*a*, 106*b*, the electric motors 106*a*, 106*b* can be controlled to a high degree of accuracy, e.g. much higher than typical hydraulic motors. The high degree of accuracy in the control of the electric motors 106*a*, 106*b* enables different input and/or output measures to be used for controlling the electric motors 106*a*, 106*b*.

Thus, according to some aspects, the tree harvesting machine 120 comprises a sensor 132 arranged to determine the current state, and wherein the current state comprises a current angle of a shaft of a rotor and/or input power and/or output power of the at least one of the electric motors 106*a*, 106*b*. The current state may then be used to control the electric motors 106*a*, 106*b*.

In order to achieve a high torque it is necessary to know the angle of a shaft of a rotor of the electric motor 106*a*, 106*b*. Since the motor 106*a*, 106*b* typically runs at high speeds, measured in revolutions per minute, RPM, the angle is more difficult to determine the farther away from the electric motor 106*a*, 106*b* a measurement apparatus arranged to measure the angle is. Thus, measuring the angle of the shaft at each electric motor 106*a*, 106*b*, either using the electric motors 106*a*, 106*b* themselves or using angle sensor at the power inverters 112, the distance between the measuring apparatus and the electric motor 106*a*, 106*b* is minimized.

The tree harvesting machine 120 may further comprise a control unit 130 arranged to control at least one of the electric motors 106*a*, 106*b* and/or a functional unit of the tree harvesting machine based on an obtained current state relating at least one of the electric motors 106*a*, 106*b*. The current state may be, for instance, an input power, an output power or the angle of a rotor with respect to a stator. The angle of the rotor with respect to the stator is often measured based on an angle of a shaft of the rotor. Information relating to the current state may be obtained by any of the above mentioned means. The functional unit may comprise actuating means. The actuating means may comprise at least one of a hydraulic cylinder, a hydraulic motor or an electric motor.

In addition to using the information relating to the current state to control the electric motors 106*a*, 106*b*, the information may also be used for diagnostic and/or troubleshooting purposes. Thus, according to some aspects, the control unit 130 is further arranged to transmit data related to the current state to a monitoring unit for diagnosis and/or troubleshooting.

For instance, if the saw 104 comprises a saw chain, which is only allowed to saw up to 40 m/s, the saw can be controlled to operate at a desired output power, e.g. 50 kW, at a speed of the motor that ensures that the saw chain is not exceeding saw speeds of 40 m/s.

The output power and the stress experienced by the saw chain also depend on the pressure experienced by the saw 104 when the saw 104 is pressed against a tree during sawing. Thus, according to some aspects, the functional unit comprises actuating means arranged to adjust a current pressure of the saw 104 based on an output power of the current state. The current pressure of the saw 104 may be pressures of valves or hydraulic cylinders arranged to regulate how hard the saw 104 is to press against a tree. The current pressure of the saw 104 may be a load of an electric motor of the actuating means, wherein the electric motor of the actuating means is arranged to regulate how hard the saw 104 is to press against a tree.

An electric motor is often heavier than a corresponding hydraulic motor and it is therefore desirable to find ways of optimizing the ratio between the weight of the electric motor to the output power of the electric motor. One way to improve the ratio between the weight and the output power is to use relatively lightweight electric motors that are operated at high speeds during operational use of the tree harvesting machine 120. However, lightweight electric motors might not be able to provide the necessary torque required for operation use of the tree harvesting machine 120. Thus, according to some aspects, a gear 110 is arranged between each feed wheel 102 and the respective electric motor 106*b* to provide a predetermined torque to the feed wheel 102 based on a predetermined output power of the respective electric motor 106*b* arranged to drive the feed wheel 102.

The first pump 124*a* is arranged to provide hydraulic power for propulsion of the tree harvesting machine 120 via a first hydraulic interface 126*a*. The second pump 124*b* is arranged to provide hydraulic power for operating the crane arm 118 via a second hydraulic interface 126*b* and is further arranged to provide hydraulic fluid to the tree harvesting head 100 via a third hydraulic interface 126*c*, the hydraulic fluid cooling the electric motors 106*a*, 106*b* and the power inverters 112. The third hydraulic interface 126*c* may be further arranged to provide the hydraulic fluid to the tree harvesting head 100 via a hydraulic interface 116 of the tree harvesting head 100. According to an aspect, the hydraulic fluid cooling mechanism is arranged to provide hydraulic fluid such that the temperature of the hydraulic fluid does not exceed a predetermined maximum temperature. According to an aspect, the hydraulic cooling fluid is taken directly from a pressurised line of the tree harvesting machine 120 via a reducer. According to another aspect, the hydraulic cooling fluid is provided via a separate unpressurised feed line.

During operational use of the tree harvesting machine 120, the friction between a trunk of a tree and the tree harvesting head 100 is typically sufficient to act as a brake. In some cases a braking mechanism of the tree harvesting head might be desirable, e.g., when feeding a trunk free of branches at an inclination. An aspect of a dynamic brake is then achieved by arranging the rectifier 122 and the power inverters 112 to be able to function as both rectifier and power inverter. The electric motors 106b driving the feed wheels 102 may then be used as electric generators. The generated current is the passed on to the motor 131 via the electric generator 124c in electric contact with the motor 131 in order to power the motor 131 and its associated loads.

Figure 2A:
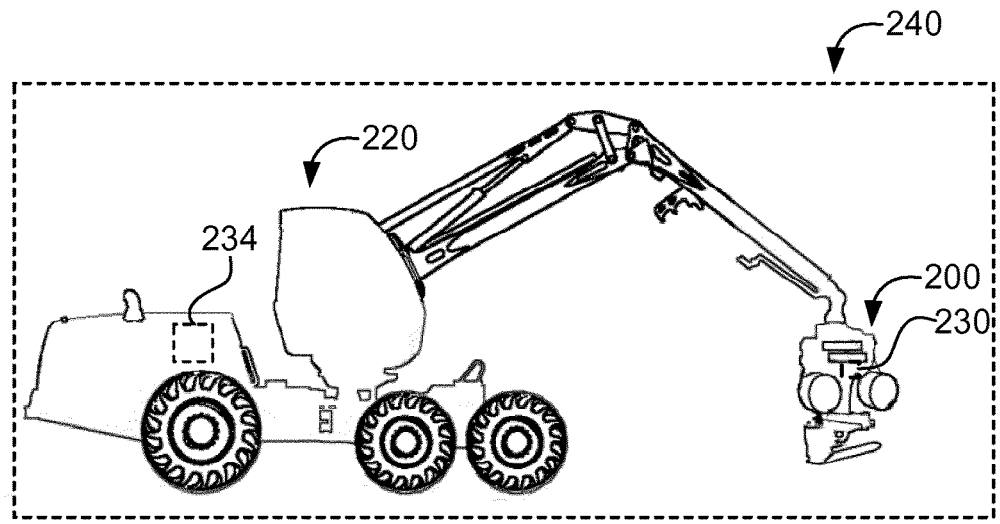
FIGS. 2a and 2b illustrate tree harvesting monitoring systems according to the present disclosure.
Figure 2B:
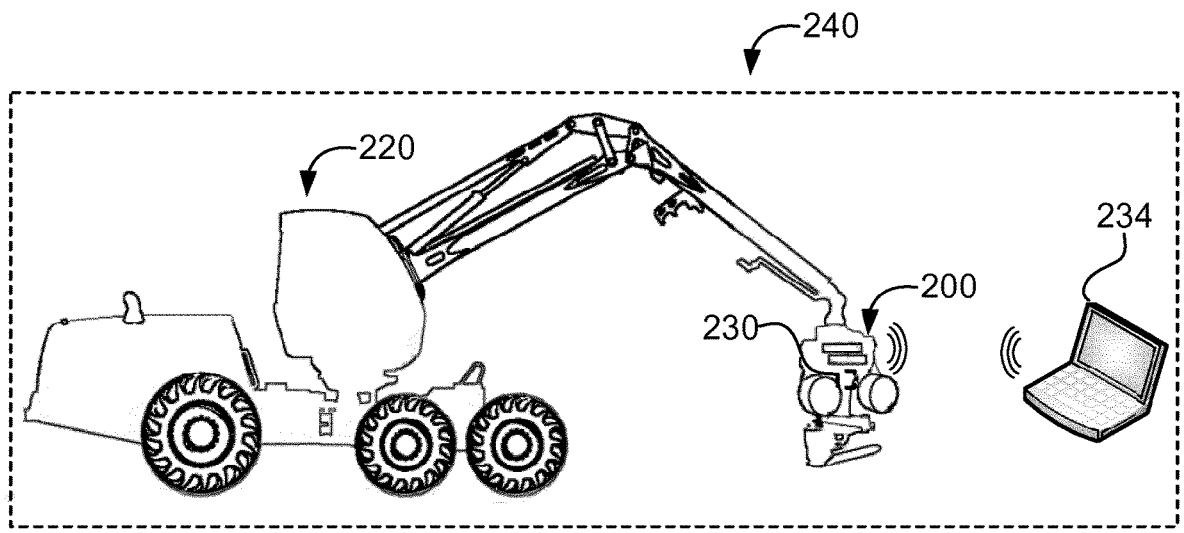

FIGS. 2a and 2b illustrate tree harvesting monitoring systems 240 according to the present disclosure.

Each tree harvesting monitoring system 240 comprises a monitoring unit 234 for diagnosis and/or troubleshooting and a tree harvesting machine 220. The monitoring unit 234 and the tree harvesting machine 220 are communicatively linked. The tree harvesting machine 220 is a tree harvesting machine 220 according to the present disclosure. The monitoring unit 234 is arranged to obtain data relating to a current state of at least one of the electric motors. The monitoring unit 234 is also arranged to perform diagnosis and/or troubleshooting based on the obtained data.

Being able to perform diagnosis and/or troubleshooting can lead to considerable time savings. The monitoring unit 234 may be arranged to continuously provide an operator with information relating to a current state of the tree harvesting machine 220. The diagnosis and/or troubleshooting may relate to a current state of one or more electric motors. For instance, the monitoring unit may be arranged to monitor the output power and the pressure exerted on the saw of the tree harvesting head 200 during sawing. Information relating to the output power and the pressure exerted on the saw may then be diagnosed to determine if the pressure applied by the saw on a tree, and hence the pressure exerted on the saw, should be adjusted. According to some aspects, the monitoring unit is arranged to obtain data relating to a speed of an electric motor. The speed of the electric motor may then be used in combination with information relating to an output power of the electric motor to determine if free spinning occurs. For instance, a high speed of the electric motors arranged to drive the feed wheels combined with a low output power may indicate that the feed wheels are spinning against a tree without moving it. Similarly, a high speed of the electric motor arranged to drive the saw combined with a low output power may indicate a saw that is running but not cutting into a tree.

In addition to performing diagnosis and/or troubleshooting, it may be desirable to perform automated actions in response to the received or retrieved data. Therefore the tree harvesting machine 220 may also comprise a control unit 230 arranged to control at least one of the electric motors and/or a functional unit of the harvesting machine based on the current state. According to some further aspects, the control unit 230 is arranged at the tree harvesting head 200. The control unit 230 is further arranged to receive control signals from the monitoring unit 234. Troubleshooting based on the obtained data comprises transmitting a control signal arranged to adjust the mechanical output power of the at least one electric motor and/or a functional unit of the harvesting machine to the control unit 230 of the tree harvesting machine 220.

The control unit 230 may then be arranged to automatically adjust the pressure exerted on the saw or the speed of any of the electric motors in the situations described above. The control unit 230 may further be arranged to provide assistance to inexperienced operators. For instance, the control unit 230 may be arranged to ensure that trees are fed through the tree harvesting head 200 within a predetermined speed interval. According to some aspects, the control unit 230 is arranged to feed a tree a predetermined distance by controlling the electric motors arranged to drive the feed wheels. According to some aspects, the control unit 230 is arranged to keeping a predetermined speed interval and a predetermined output power of the electric motor arranged to drive the saw, while simultaneously keeping the pressure exerted on the saw within a predetermined interval.

It may be of interest to store information passing through the tree harvesting monitoring system 240 or process the information using computational resources that have more computational power than typically found in tree harvesting machines. Thus, according to some aspects, the monitoring unit 234 and the tree harvesting machine 220 are separate devices that are wirelessly linked. According to some further aspects, the control unit 230 is arranged at the monitoring unit 234. By separating the monitoring unit 234 from the tree harvesting machine 220, the monitoring unit 234 may be configured to meet the storage and computational needs of the monitoring system without requiring any reconfiguration of the tree harvesting machine 220. Additionally, the monitoring unit 234 is not subjected to the stresses experienced by the tree harvesting machine 220, e.g. vibrations that may damage sensitive circuitry.

Separating the tree harvesting machine 220 and the monitoring unit 234 enables a person other than the operator of the tree harvesting machine to monitor the operational use of the tree harvesting machine 220. This is particularly useful in e.g. training of inexperienced personnel, when an experienced user may monitor the operational use remotely and take appropriate actions, e.g. based on diagnosis and/or troubleshooting information provided by the monitoring unit 234.

Figures 3A, 3B, 3C:
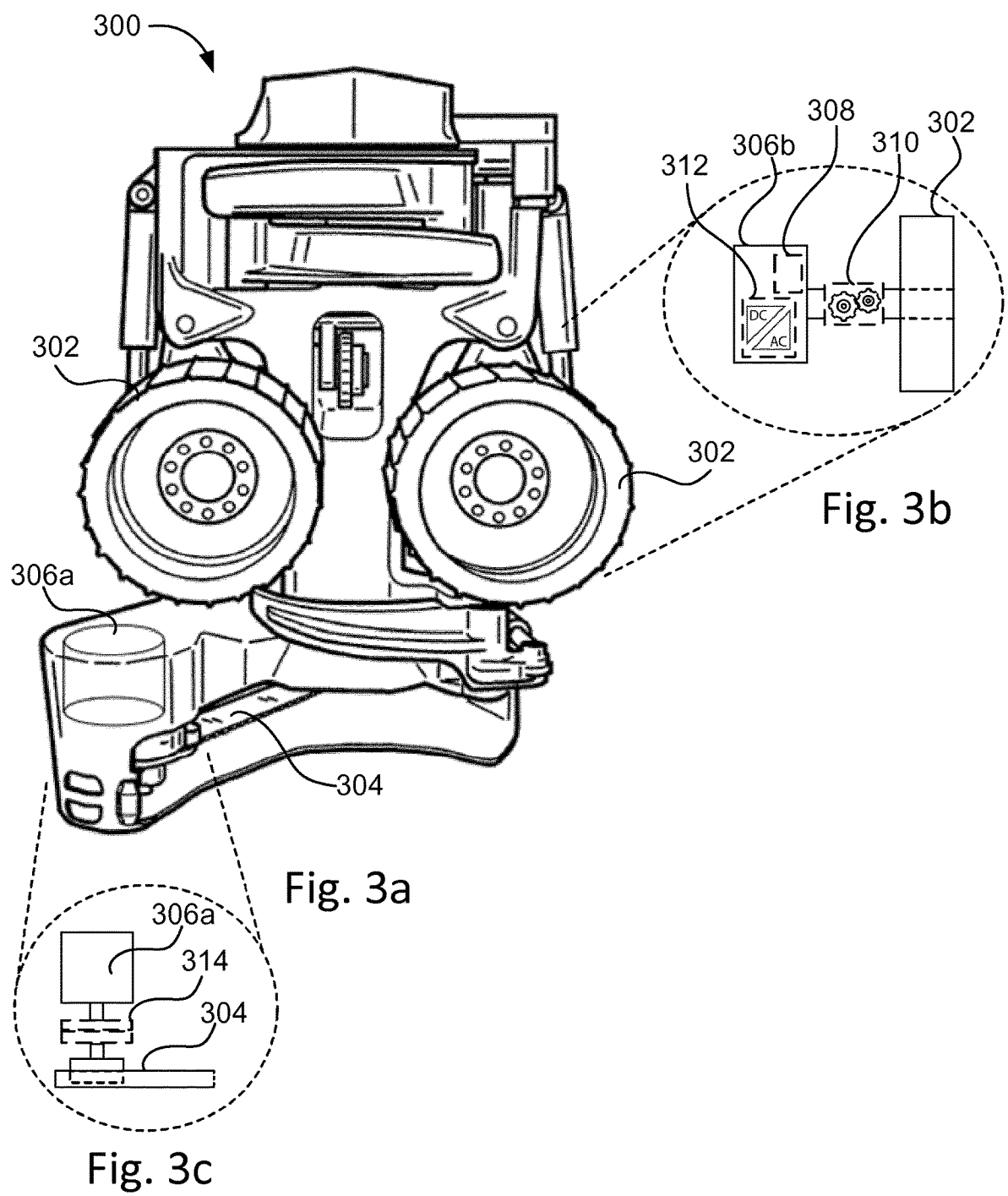
FIG. 3 illustrates a tree harvesting head according to the present disclosure.

FIG. 3 illustrates a tree harvesting head 300 for a tree harvesting machine having a crane arm. The tree harvesting head 300 comprises a saw 304 and at least two feed wheels 302. The tree harvesting head 300 further comprises an electric motor 306a arranged to drive the saw 304, and at least one electric motor 306b arranged to drive the feed wheels 302. Most of the energy loss in hydraulic powered tree harvesting heads occurs at the saw and the feed wheels. By introducing electric motors 306a, 306b to drive the saw 304 and the feed wheels 302, the energy efficiency of the tree harvesting head 300 is greatly improved with respect to conventional hydraulic powered tree harvesting heads.

The energy efficiency can be further improved by optimizing the ratio between the weight of the electric motors and their output power. Thus, according to some aspects, the at least two feed wheels 302 each have a dedicated electric motor 306b arranged to drive the respective feed wheel 302. The sharing of the workload between several electric motors 306b enables a more effective dimensioning of the electric motors 306b than if only a single electric motor was arranged to drive all feed wheels 302.

As has been described above in relation to FIG. 1, it may be desirable to determine a current state of the electric motors 306a, 306b. Thus, according to some aspects, the tree harvesting head 300 comprises an angle sensor 308 arranged to determine an angle of a shaft of a rotor of a corresponding electric motor. According to some further aspects, the angle sensor 308 is comprised in the corresponding electric motor.

In order to be able to keep the weight of the electric motors 306a, 306b down while still providing a high output power, a gear 310 may be arranged between each feed wheel 302 and the respective electric motor 306b arranged to drive the feed wheel 302. The gear 310 is arranged to provide a predetermined torque to output power ratio, wherein the output power is an output power of the respective electric motor arranged to drive the feed wheel 302.

During operational use of the tree harvesting head 300, heat is emanated from the electric motors 306a, 306b and any power inverters 312 of the tree harvesting head 300. In order to prevent too much heat to build up, the tree harvesting head 300 may comprise a hydraulic interface arranged to provide hydraulic fluid from the tree harvesting machine, the hydraulic fluid cooling at least one of the electric motors 306a, 306b and/or at least one power inverter 312 of the tree harvesting head 300.

During operational use of the tree harvesting head 300, the saw 304 is sometimes subjected to abrupt stops. Due to the considerable kinetic energy built up in the moving components of the saw during the operational use, the abrupt stop will put considerable stress on the saw. A particular risk for chain saws is the risk of having the chain torn apart due to stress from the components moving the chain having great kinetic energy that is dissipated via the chain. To reduce the risk of damage, as well as reducing effects of wear and tear on both the saw 304 and the electric motor 306a driving the saw 304, a slip clutch 314 may be arranged between the 304 saw and the electric motor 306a arranged to drive the saw 304, wherein the slip clutch 314 is arranged limit the amount of mechanical power applied to the saw 304 such that the applied mechanical power stays below a predetermined safety limit.

As has been explained above, the kinetic energy may risk damaging the saw 304 and/or the electric motor 306a due to abrupt stops. If the rotor of the electric motor 306a is relatively light, it carries less kinetic energy at a given speed compared to a heavier rotor rotating at the same speed. Less kinetic energy implies reduced risk of damage, as well as reduced wear and tear. Thus, according to some aspects, a rotor of the electric motor 306a arranged to drive the saw 304 has a moment of inertia selected to prevent a saw chain of the saw 304 to be damaged due to stress associated with transfer of kinetic energy to the saw chain during an abrupt stop of the electric motor 306a arranged to drive the saw 304.

In FIGS. 1 and 2, different control units have been described, with the respective associated technical effects. Many of the most critical components of a tree harvesting machine or system comprising a tree harvesting head according to the present disclosure are located at the tree harvesting head. To reduce the signalling distance between critical components and a control unit, it may be advantageous to arrange the control unit at the tree harvesting head. Thus, according to some aspects, the tree harvesting head 300 comprises a control unit arranged to control at least one of the electric motors and/or a functional unit of the tree harvesting head based on an obtained current state relating to at least one of the electric motors. Arranging a control unit at the tree harvesting head may also reduce the number of potential points of failure between the control unit and components of the tree harvesting head 300.

Figure 4:
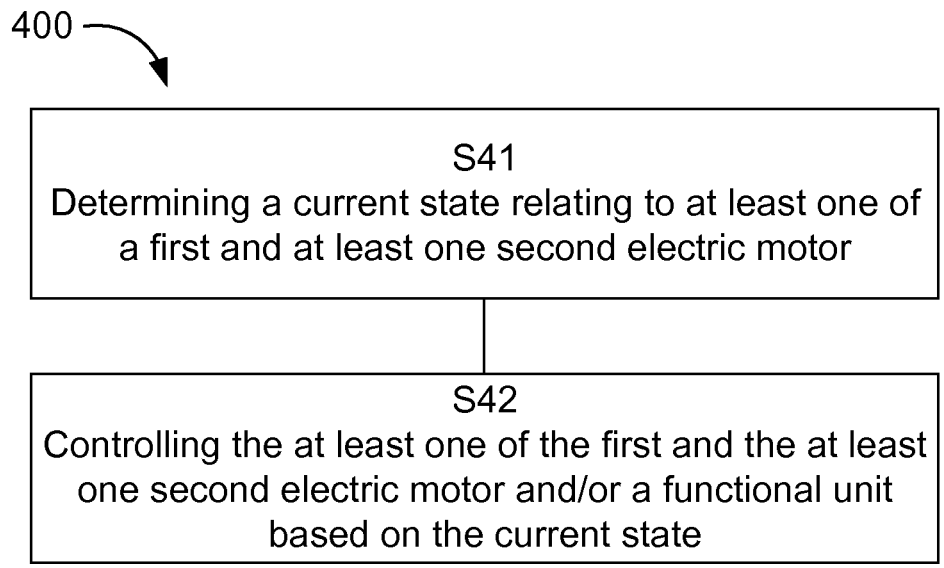
FIG. 4 illustrates method steps for controlling operation of a tree harvesting head according to the present disclosure.

FIG. 4 illustrates method steps of a method 400 for controlling operation of a tree harvesting head comprising a saw controlled by a first electric motor and at least two feed wheels controlled by at least one second electric motor. The method 400 comprises determining S41 a current state relating to at least one of the first and the at least one second electric motor and controlling S42 the at least one of the of the first and the at least one second electric motor and/or a functional unit of the tree harvesting head based on the current state. The method steps corresponds to actions performed by components of either the tree harvesting machine, the tree harvesting monitoring system or the tree harvesting head as discussed above and have all the associated effects and advantages.

The present disclosure also relates to a computer program comprising computer program code which, when executed in an element communicatively linked to a tree harvesting head comprising a saw controlled by a first electric motor and at least two feed wheels controlled by at least one second electric motor, causes the element to perform steps of the method for controlling operation of a tree harvesting head. The element may comprise a control unit of the tree harvesting head and/or a monitoring unit of a tree harvesting monitoring system and/or a control unit of a tree harvesting machine. Units of the element, i.e. any control unit(s) and the monitoring units comprised in the element, are directly or indirectly communicatively linked to at least one of the electric motors and arranged to control said at least one of the electric motors.

Figure 5:
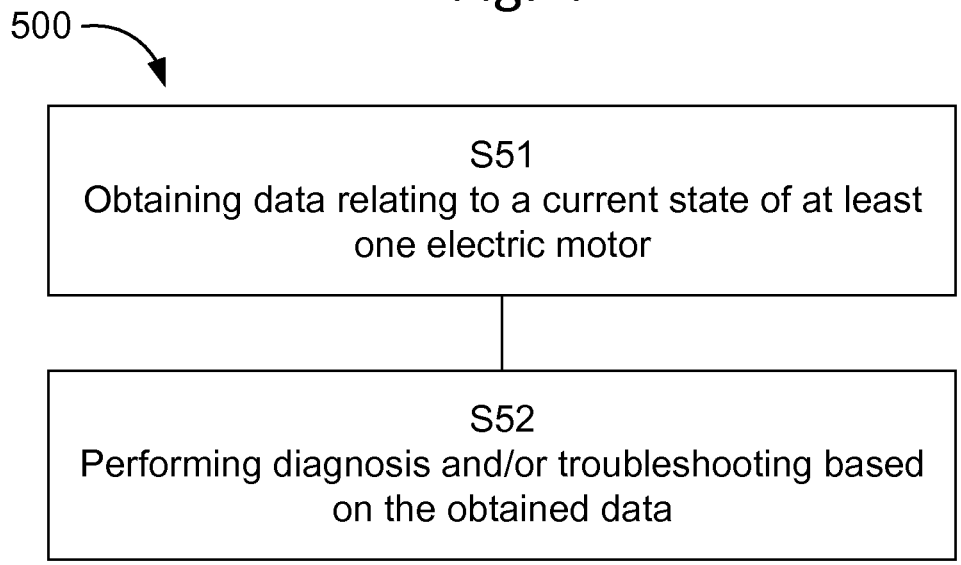
FIG. 5 illustrates method steps for monitoring operation of a tree harvesting machine according to the present disclosure.

FIG. 5 illustrates method steps of a method 500 for monitoring operation of a tree harvesting machine, wherein the tree harvesting machine comprises a tree harvesting head comprising a saw controlled by a first electric motor and at least two feed wheels controlled by at least one second electric motor. The method 500 comprises obtaining S51 data relating to a current state of at least one of the electric motors and performing S52 diagnosis and/or troubleshooting based on the obtained data. The method steps corresponds to actions performed by components of either the tree harvesting machine, the tree harvesting monitoring system or the tree harvesting head as discussed above and have all the associated effects and advantages.

The present disclosure also relates to a computer program comprising computer program code which, when executed in an element communicatively linked with the tree harvesting machine, causes the element to perform the steps of the method for monitoring operation of a tree harvesting machine. Said element may comprise a control unit of the tree harvesting head and/or a monitoring unit of a tree harvesting monitoring system and/or a control unit of a tree harvesting machine. Units of the element, i.e. any control unit(s) and the monitoring units comprised in the element, are directly or indirectly communicatively linked to at least one of the electric motors and arranged to control said at least one of the electric motors.

The invention claimed is:

1. A tree harvesting machine having a crane arm, wherein the crane arm comprises a tree harvesting head arranged at a free end of the crane arm, wherein the tree harvesting head comprises:
   a saw and at least two feed wheels,
   an electric motor arranged to drive the saw,
   at least one electric motor arranged to drive the feed wheels, and
   an additional electric motor arranged to regulate how hard the saw is to press against the tree, said additional electric motor being controlled by load on the electric motor arranged to drive the saw to ensure that the mechanical stress experienced by a saw chain of the saw is within predetermined limits.

2. The tree harvesting machine according to claim 1, wherein the tree harvesting machine is arranged to provide hydraulic fluid to the tree harvesting head via a hydraulic interface of the tree harvesting head, the hydraulic fluid cooling at least one of the electric motors or at least one power inverter of the tree harvesting head.

3. The tree harvesting machine according to claim 1, wherein the tree harvesting machine further comprises a control unit arranged to control at least one of the electric motors of the tree harvesting machine based on an obtained current state related to at least one of the electric motors.

4. The tree harvesting machine according to claim 3, wherein the tree harvesting machine comprises a sensor arranged to determine the current state, and wherein the current state is selected from a current angle of a shaft of a rotor, an input power of the at least one of the electric motors, an output power of the at least one of the electric motors, and any combination thereof.

5. The tree harvesting machine according to claim 3, wherein the control unit is further arranged to transmit data related to the current state to a monitoring unit for the purposes selected from diagnosis, troubleshooting, and both diagnosis and troubleshooting.

6. A tree harvesting head for a tree harvesting machine having a crane arm, wherein the tree harvesting head comprises a saw and at least two feed wheels, wherein the tree harvesting head further comprises an electric motor arranged to drive the saw, at least one electric motor arranged to drive the feed wheels, and an additional electric motor arranged to regulate how hard the saw is to press against the tree, said additional electric motor being controlled by load on the electric motor arranged to drive the saw to ensure that the mechanical stress experienced by a saw chain of the saw is within predetermined limits.

7. The tree harvesting head according to claim 6, wherein the at least two feed wheels each have a dedicated electric motor arranged to drive the respective feed wheel.

8. The tree harvesting head according to claim 6, wherein the tree harvesting head comprises an angle sensor arranged to determine an angle of a shaft of a rotor of a corresponding electric motor.

9. The tree harvesting head according to claim 8, wherein the angle sensor is comprised in the corresponding electric motor.

10. The tree harvesting head according to claim 6, wherein a gear is arranged between each feed wheel and the respective electric motor arranged to drive the feed wheel, the gear being arranged to provide a predetermined torque to output power ratio, the output power being an output power of the respective electric motor arranged to drive the feed wheel.

11. The tree harvesting head according to claim 6, wherein the tree harvesting head comprises a hydraulic interface arranged to provide hydraulic fluid from the tree harvesting machine, the hydraulic fluid cooling at least one of the electric motors and/or at least one power inverter of the tree harvesting head.

12. The tree harvesting head according to claim 6, wherein a slip clutch is arranged between the saw and the electric motor arranged to drive the saw, wherein the slip clutch is arranged limit the amount of mechanical power applied to the saw such that the applied mechanical power stays below a predetermined safety limit.

13. The tree harvesting head according to claim 6, wherein a rotor of the electric motor arranged to drive the saw has a moment of inertia selected to prevent a saw chain of the saw to be damaged due to stress associated with transfer of kinetic energy to the saw chain during an abrupt stop of the electric motor arranged to drive the saw.

14. The tree harvesting head according to claim 6, wherein the tree harvesting head further comprises a control unit arranged to control at least one of the electric motors of the tree harvesting head, the additional electric motor of the tree harvesting head, and both the at least one of the electric motors and the additional electric motor of the tree harvesting head based on an obtained current state relating to at least one of the electric motors.

* * * * *